United States Patent [19]
Ellis

[11] 3,967,847
[45] July 6, 1976

[54] CHUCK APPARATUS FOR GLASS CONTAINER COATING LINE

[75] Inventor: Warren L. Ellis, Lancaster, Ohio

[73] Assignee: Anchor Hocking Corporation, Lancaster, Ohio

[22] Filed: Sept. 15, 1975

[21] Appl. No.: 613,617

[52] U.S. Cl. .............................. 294/116; 279/37; 198/22 B; 198/179; 214/1 BA
[51] Int. Cl.² ........................................... B66C 1/42
[58] Field of Search.......... 294/116, 115, 105, 86 R, 294/87 R, 87.24; 269/13; 198/179, 131, 22 B, DIG. 8; 214/1 BA, 309, 1 BT; 279/37, 1 B

[56] References Cited
UNITED STATES PATENTS 3,240,520 3/1966 Dailey et al.......................... 279/37
3,894,630 7/1975 Shank, Jr. .......................... 198/22 B Primary Examiner—James B. Marbert
Attorney, Agent, or Firm—Wood, Herron & Evans

[57] ABSTRACT

A chuck for gripping a glass container has jaws in the form of arcuate segments of a tube. The jaws hang on pins that project outwardly from a central base, and they are cammed inward to a container finish-gripping position by a spindle mounted annular sleeve whose weight is applied to the jaws only, at a position that is substantially radially outwardly of the line along which the jaws engage the container.

8 Claims, 4 Drawing Figures

U.S. Patent  July 6, 1976  3,967,847
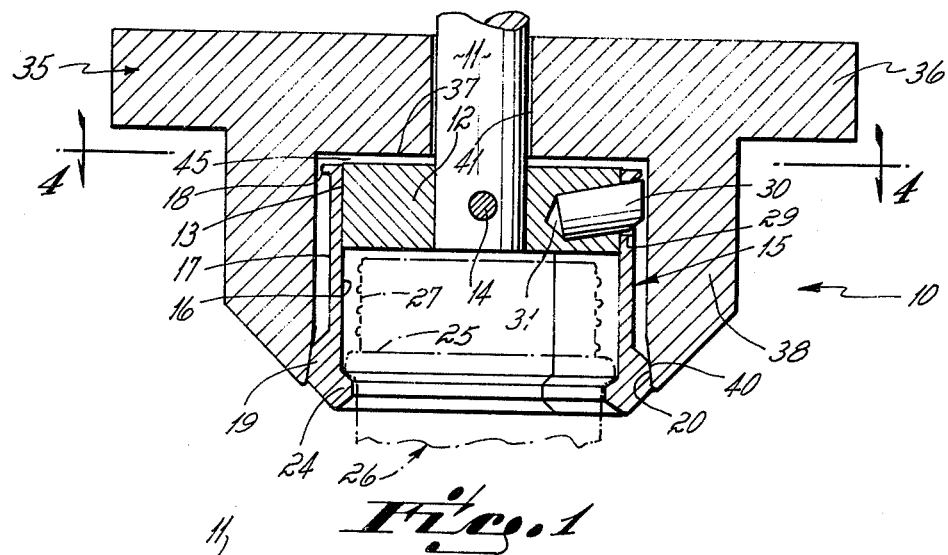
FIG. 1
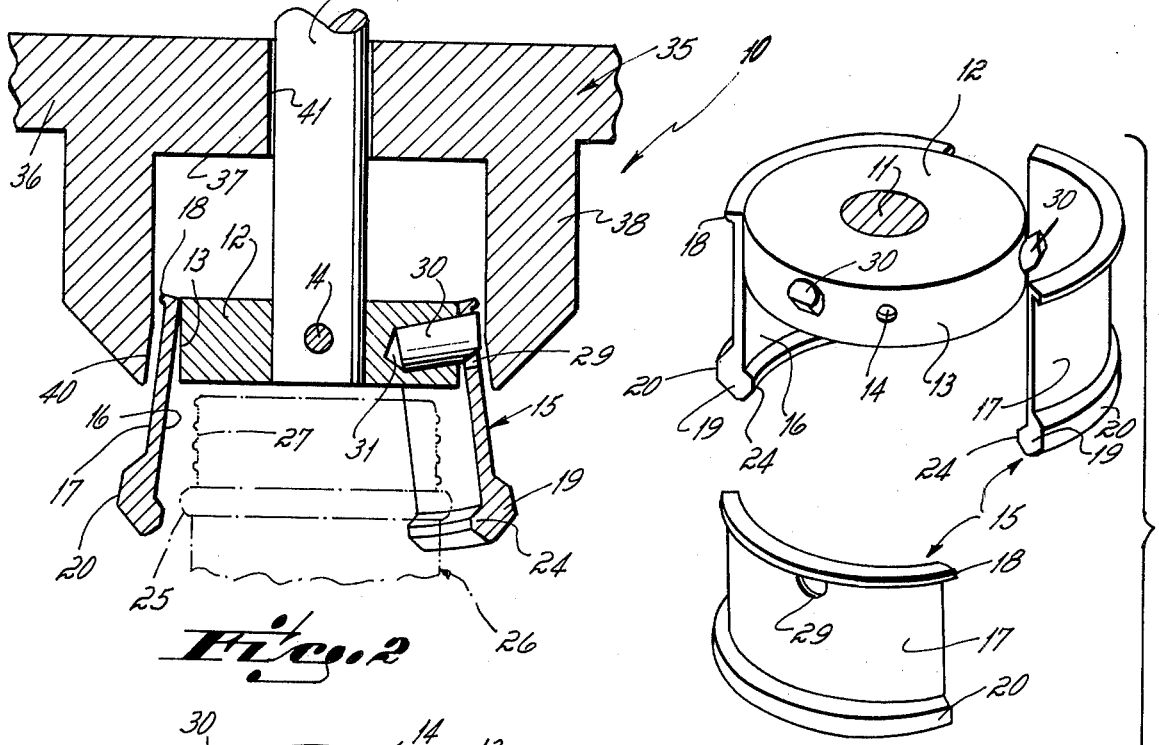
FIG. 2
FIG. 3
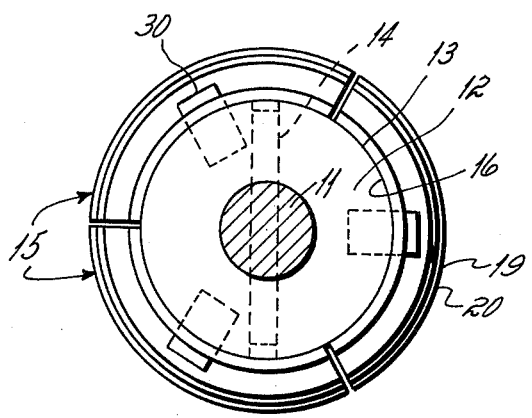
FIG. 4

CHUCK APPARATUS FOR GLASS CONTAINER COATING LINE

FIELD OF THE INVENTION

This invention is directed to a chuck of the type which is used to carry glass containers along a coating line on which the containers are externally coated with plastic.

Plastic coatings are now being applied to some types of glass containers, to improve their strength and handleability. Such coatings are commonly applied in fine particle form to the outside surface of the container, then fused and/or cured to harden them. For this purpose, the containers are suspended or hung in vertical position by the finish (or closure receiving) portion at the top of the container. It is the common practice to grip the container finish by a chuck which then carries the container through the coating line wherein the plastic is applied. The container is thereafter carried into a heating zone wherein the plastic is heated sufficiently to fuse or harden it to form a smooth tough skin over the glass.

THE PROBLEM IN THE ART

U.S. Pat. No. 3,863,753, to Herbert C. Shank, issued Feb. 4, 1975, describes one form of chuck apparatus for this purpose. In the structure according to that patent, the chuck, which is mounted to a spindle, includes a central chuck body to which the chuck jaws are pivotally mounted. Each jaw includes pivot pins which project perpendicularly to a line radial to the chuck spindle and body axis. The pivot pins of each jaw are received in upwardly opening slots that are formed, as by milling, into the chuck body. U.S. Pat. No. 3,894,630 issued July 15, 1975, describes a related form of chuck, also having such transverse pins.

In a typical production coating line, the containers are chucked at a loading station, then are carried sequentially through a preliminary heating station, a coating station, a furnace for setting the resin coating, a cooling station, and finally to an unloading station. Such a line, for continuous operation, will often include several hundred chucks, the cost of which is a substantial capital item. Apart from cost, in operation some particulate plastic tends to become adhered to the chuck in the cycles of heating, coating, and cooling, and tends to cause sticking or jamming of the jaws if not removed. This factor, together with the repeated lifting and lowering of the sleeve which holds the jaws inwardly to grip the container, has tended to cause fairly rapid wear on the jaws.

In the structures of the two Shank patents above identified, the jaws have inward lips on which rest a rib on the finish of the bottle, so that the bottle hangs suspended below these lips. The sleeve has a cam which engages a sloping shoulder on the outside of the jaws to hold the jaws inwardly, as shown in FIG. 3 of Shank U.S. Pat. No. 3,863,753. It has been found that that construction is rather sensitive to wear caused by the sliding camming movement of the sleeve over the jaws. As the sleeve is raised and lowered over many cycles of operation, wear of the jaw lips and the camming surfaces, allows jaw radial movement when the sleeve is at its lowermost position. This looseness of the jaws can result in loss of grip on the container, or at least an inadequate grip. Moreover, the jaws of the Shank chucks have been formed from bar stock by an operation which includes a complex milling operation, necessary to form the posts from which the pivot pins project. The formation of the pin receiving slots in the chuck body also adds substantial expense to the cost of the patented chuck.

It has been a primary objective of this invention to provide an improved type of chuck of the general type shown in the above identified Shank patents, wherein the problem of relative wear between the sleeve and jaws is minimized, and wherein the chuck and jaws are of a less expensive construction.

SUMMARY OF INVENTION

In accordance with a preferred embodiment of the invention, a chuck is provided having a disclike, central, jaw-mounting body secured to the lower end of a vertical shaft or spindle. The jaws comprise axially symmetric, arcuate segments, and their inner faces have a configuration which approximates the periphery of the disclike body. Jaw mounting pins project radially outwardly from the cylindrical sidewall of the body at spaced locations, and are slightly angulated upwardly. The jaws hang from these pins, which pass through oversize radial openings in the respective jaws. Each jaw can swing on its pin about an axis transverse to the pin, while the interfitting concavity of the jaw and convexity of the body prevents the jaw from being twisted out of alignment on the body.

On the inside surface of each jaw, adjacent the lower edge, runs an inwardly projecting lip, this lip being configurated to be engaged beneath the finish of a bottle, thereby to support the bottle. Externally, each jaw has a camming surface that lies substantially diametrically outwardly of the internal lip. The jaws are operated by a sleeve which is in the form of a skirt that projects from a top plate which overlies the body. The skirt of the sleeve has a cam shaped to engage the external camming surface on the jaws, at a region substantially in line with the lip by which the jaw supports the container. When a bottle is engaged, the top plate of the sleeve does not engage the body, but is spaced axially above it by a clearance gap, but when no bottle is engaged, the sleeve top plate rests on the body, without exerting a jamming force on the jaws.

THE PRIOR ART

Birch U.S. Pat. No. 102,753 shows a watch key wherein elongated flexible jaws are slidably mounted in a tubular sleeve by a rivet which passes through the jaws and through opposed slots in the sleeve. The jaws are sprung outwardly so that they are biased as a spring against the inside of the sleeve. The jaws are cammed together to a closed position by shifting the sleeve axially.

Audibert U.S. Pat. No. 1,723,717 shows a bit socket having jaws mounted on a pin which passes radially through a narrow flat web which projects axially from a shank. The jaws "rock" on the web, and are engaged by both ends of a surrounding sleeve. When the sleeve is shifted upwardly, it cams an upper part of the jaws inwardly so that the jaws "rock" on the web to open position, and when the sleeve is slid downwardly on the jaws, it cams them inwardly to grip the tapered end of a bit. A locking lever is provided to hold the sleeve in the locked position with respect to the shank.

The invention can best be further described by reference to the accompanying drawings in which, FIG. 1 is a fragmentary vertical section of a preferred form of chuck in accordance with the invention, with the jaws engaging and supporting a bottle by the finish thereof, the sleeve being in the holding position, FIG. 2 is a section similar to FIG. 1, but illustrates the chuck with the sleeve lifted, showing the manner in which the jaws are gravity biased to open position, to release the container, FIG. 3 is an exploded perspective view showing the manner in which the jaws fit on the pins of the chuck body, and FIG. 4 is a horizontal section taken on line 4—4 of FIG. 1.

The preferred form of chuck is designated generally at 10 in the drawings. It comprises a vertically oriented mounting shaft or spindle 11 which is supported at its upper end by means not shown but which may for example be as shown in previously identified U.S. Pat. No. 3,863,753. A chuck body 12 is pinned, as at 14, to the lower end of spindle 11. As better shown in FIG. 3, body 12 is in the form of a disk or cylinder. Body 12 has a diameter which slightly exceeds the diameter of the finish 27 of the container 26 which is to be carried in the chuck, in order that the jaws will be cammed inwardly from the body to grip the bottle finish.

Chuck 10 has a plurality of jaws, three in the preferred embodiment shown, designated individually at 15, all of which may be similar in configuration. The jaws 15 are in the form of axially symmetrical arcuate segments, similar to segments sliced from a turned tube. The jaws may be, although they are not necessarily, formed by slitting a turned tube into segments. Each jaw has an inside face 16 which preferably has essentially the same configuration or radius of curvature as the cylindrical sidewall surface 13 of chuck body 12. Each jaw 15 has an outside face or surface 17 which has a rim 18 around its upper edge and a rib 19 around its lower edge, which presents an outwardly and downwardly angulated camming surface 20. Adjacent the lower edge of jaw inside surface 16, a lip 24 projects inwardly, shaped to engage beneath a rib 25 of container 26, indicated in broken lines in FIGS. 1 and 2, to support the container in use. It will be seen in the drawings that the internal lip 24 of the jaw lies substantially radially inwardly of the external camming surface 20, although not necessarily exactly so.

Each jaw 15 has radial opening 29 which is oversized with respect to a radial support pin 30 presented by the body 12. The pins 30 are mounted in drill holes 31 in the body and project at a slight upward angle, preferably about 7°, at uniformly spaced positions.

The jaws are mounted to the body merely by hanging them from the respective pins 30. The angulation of the pins tends to cause the jaws to slide inwardly against the sidewall 13 of the body, so that they will not fall off when the sleeve is not in place to capture them. The outer ends of the pins extend just through the jaw openings 29.

The jaws are cammed inwardly, to grip a container, by the sleeve which is designated generally at 35. The sleeve includes an upper or top plate 36 from the lower face 37 of which a jaw-surrounding skirt 38 depends. The vertical spindle 11 passes freely through an opening 41 in the top plate, and the sleeve is raised and lowered with respect to the jaws by suitable means not shown, and which may be similar to the sleeve lifting means described in U.S. Pat. No. 3,863,753.

The skirt engages the jaws only through a cam 40 adjacent the lower edge of the skirt, this cam 40 being engageable with the cam rib 20 of the jaws. Above cam 40, the inside diameter of the skirt is sufficient to provide sliding clearance on pins 30. The upper rims 18 on the jaws limit the range of outward sliding movement of the jaws on the pins, and the pins cannot slide outwardly so far that the pins do not project all the way through the holes 29.

In use, as seen in FIG. 1, weight of the sleeve 35 is transmitted to the jaws solely through the cam surfaces 40, 20 so that the ribs 24 are engaged below container rib 25. It will be noted that the jaws are held inwardly by a force which is directed essentially radially through them, that is, the camming force from the sleeve is applied more or less radially in line with the jaw surface 24. In the previously identified Shank patents, the sleeve acted on the jaws well above the line of jaw-container contact. Moreover, it should be noted that the sleeve top plate 36 does not contact or rest on the body 12 when the jaws engage the container, there being a clearance gap 45 between the lower face 37 of the top plate and the top of body 12. This is achieved by forming cam 40 on the skirt a distance below the top plate which is greater than the distance between the body and jaw rib 24. This clearance gap assures that the weight of the sleeve is transmitted entirely as camming force on the jaw, and that, in use, movement of the sleeve is not arrested by the chuck body. In view of this, it can be seen that wear on the cooperating camming surfaces 20, 40 does not cause a reduction in gripping force, in contrast to the earlier construction, and that the sleeve is simply let down further into the clearance gap 45. A gap of about 0.040 inch is usually sufficient. Thus, there is no loss of grip arising from bottoming of the sleeve on the top of the chuck body. When the jaws are not gripping a container, their top plate does rest on the body, and the jaws are not cammed inwardly so far as to become jammed together.

By reason of the circular curvature of each jaw, its center of gravity will lie radially inwardly of the surface 16. This can be visualized by reference to FIG. 3. Since the jaw is supported on the pin at a radially outward point, the jaws will be biased open by gravity and will open unless restrained from doing so by the sleeve. Thus, when sleeve 35 is lifted so that sleeve cam surface 40 is disengaged from the jaw surface 20, the jaw will automatically open to receive (or to release) a container. (It is further desirable to spin the entire chuck by rotation of shaft 11, to insure that the jaws will open even if there is some sticking resulting from the application of the plastic coating.) When the sleeve is lifted to open the jaws, as in FIG. 2, the jaws are permitted to swing outwardly sufficiently to release the container, but the extent of sleeve vertical movement is usually limited to below the point at which the jaws would no longer be captured on the pins 30, inside the sleeve.

The jaws can be formed from tubular stock, for example of stainless steel, by turning to configure the lips and rims 18, 19 and 24 thereon, drilling the opening 29, then slitting the tube longitudinally into three arcuate sections. It is also contemplated that jaws of this general configuration can be formed by stamping and/or bending from flat sheet stock to further reduce costs. Regardless of how formed, the jaws will have a shape approximating an arcuate segment of a tube.

Having described the invention, what is claimed is:

1. An apparatus for suspending a container by a finish portion thereof, wherein the finish portion is gripped by a chuck having jaws mounted to a chuck body and engageable under a rib on said finish portion, said body is carried on a spindle, and wherein said chuck includes a sleeve slidable axially along said spindle to engage the jaws and secure them in radially gripping engagement with said finish portion, the improvement wherein, the chuck body is in the form of a disk having a sidewall, the jaws are substantially arcuate segments each having an inwardly facing surface whose configuration approximates that of said sidewall, each said jaw being carried on a pin projecting radially outwardly from the sidewall of said body, the pin passing through an oversize radial hole in the respective jaw and terminating centrally of the sleeve, each said jaw having an inwardly facing lip for supporting said container by engagement under said rib thereon, each said jaw also having an outwardly facing cam surface which lies substantially diametrically outwardly of said lip, a cam on said sleeve engageable with the cam surfaces of said jaws to cam the jaws inwardly, clearance in the direction parallel to said spindle being provided between said sleeve and body such that in use said sleeve can engage the jaws only and not the body, the entire weight of said sleeve thereby being applied to said jaws through the said cam surfaces thereof, the dimension of said clearance being sufficient that, when wear of said jaws occurs in use, the wear is accommodated without loss of grip by greater axial movement of the sleeve relative to the jaws.

2. The improvement of claim 1 wherein said sleeve comprises a top plate through which said spindle passes, said top plate disposed above said body, a cylindrical skirt depending from said top plate around said jaws, said cam being formed on said skirt below said top plate by a distance sufficiently great to provide said clearance between said body and said top plate when said cam is camming said jaws.

3. The improvement of claim 1 wherein said pins are angulated upwardly with respect to said body so that said jaws are biased by gravity to slide on the pins toward said sidewall.

4. The improvement of claim 1 further wherein each said jaw is captured on the respective pin, between said body and said sleeve, each jaw having an outward facing rim, adjacent the pin, which limits outward movement of the jaw on the pin when so captured.

5. The improvement of claim 1 further wherein each said jaw has a center of gravity which tends to cause said jaw to swing outwardly, away from a container engaging position, and said jaw upwardly of said pin has an inwardly facing surface which comes to bear upon said body as the jaw swings outwardly and thereby limits the amount of such outward swing.

6. The improvement of claim 1 wherein said jaws are axially symmetrical, arcuate segments of a tube.

7. The improvement of claim 1 wherein said sleeve is arrested by said body only when said jaws are not engaging the container.

8. An apparatus for suspending a container by a finish portion thereof, wherein the finish portion is gripped by a chuck having jaws mounted to a chuck body and engageable under a rib on said finish portion, said body is carried on a vertical spindle, and wherein said chuck includes a sleeve slidable axially along said spindle to engage the jaws and secure them in radially gripping engagement with said finish portion, the improvement wherein, the chuck body is in the form of a disk having a cylindrical sidewall, each said jaw being carried on a pin projecting radially outwardly from the sidewall of said body, the pin passing through an oversize radial hole in the respective jaw and terminating centrally of the sleeve, each said jaw having an inwardly facing lip for supporting said container by engagement under said rib thereon, each said jaw also having an outwardly facing cam surface which lies substantially diametrically outwardly of said lip, a cam on said sleeve engageable with the cam surfaces of said jaws to cam the jaws inwardly, said sleeve including a portion overlying said body and slidable on said spindle, vertical clearance being provided between said sleeve and body, said sleeve engaging said jaws only through said cam, at a position substantially diametrically outwardly of said lip, the dimension of said vertical clearance being sufficient that, as wear of said jaws occurs in use, the wear is accommodated without loss of grip by greater axial movement of the sleeve relative to the jaws.

* * * * *